(12) United States Patent
Chosokabe et al.

(10) Patent No.: US 7,556,745 B2
(45) Date of Patent: Jul. 7, 2009

(54) SINTERED COMPACT FOR THERMISTOR ELEMENT, PROCESS FOR PRODUCING THE SAME, THERMISTOR ELEMENT AND TEMPERATURE SENSOR

(75) Inventors: Takaaki Chosokabe, Aichi (JP); Masaki Iwaya, Aichi (JP); Naoki Yamada, Aichi (JP); Wakako Takano, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 504 days.

(21) Appl. No.: 10/531,460

(22) PCT Filed: May 19, 2003

(86) PCT No.: PCT/JP03/06231

§ 371 (c)(1),
(2), (4) Date: Apr. 27, 2006

(87) PCT Pub. No.: WO2004/046061

PCT Pub. Date: Jun. 3, 2004

(65) Prior Publication Data

US 2006/0186385 A1 Aug. 24, 2006

(30) Foreign Application Priority Data

Nov. 18, 2002 (JP) ............................. 2002-334312

(51) Int. Cl.
*H01B 1/00* (2006.01)
*H01B 1/12* (2006.01)

(52) U.S. Cl. .................. 252/500; 252/509; 252/520.5; 252/521.2; 338/22 R; 338/223; 423/263; 423/593.1; 423/594.16; 423/594.2; 423/599; 423/600; 501/123; 501/126; 501/127; 501/152; 501/153

(58) Field of Classification Search .................. 252/500, 252/509, 520.5, 521.2; 501/123, 126, 127, 501/152, 153; 338/22 R, 223; 423/263, 423/593.1, 594.16, 594.2, 599, 600
See application file for complete search history.

(56) References Cited

U.S. PATENT DOCUMENTS

| | | | |
|---|---|---|---|
| 4,812,426 A * | 3/1989 | Takagi et al. ................. 501/136 |
| 5,568,116 A | 10/1996 | Iwaya et al. |
| 6,306,315 B1 * | 10/2001 | Ogata et al. ............... 252/518.1 |
| 2002/0020949 A1 | 2/2002 | Kuzuoka et al. |
| 2003/0038704 A1 * | 2/2003 | Kuzuoka et al. ........... 338/22 R |

FOREIGN PATENT DOCUMENTS

| | | |
|---|---|---|
| JP | A-07-099102 | 4/1995 |
| JP | A-11-251108 | 9/1999 |
| JP | B2-3254595 | 11/2001 |
| JP | A-2002-124403 | 4/2002 |

\* cited by examiner

*Primary Examiner*—Jerry Lorengo
*Assistant Examiner*—Carlos Barcena
(74) *Attorney, Agent, or Firm*—Morgan Lewis & Bockius LLP

(57) ABSTRACT

A sintered body for thermistor element of the invention is a sintered body for thermistor element containing Sr, Y, Mn, Al, Fe, and O, wherein not only respective liquid crystal phases of a perovskite type oxide and a garnet type oxide are contained, but also a liquid crystal phase of at least one of an Sr—Al based oxide and an Sr—Fe based oxide. $FeYO_3$ and/or $AlYO_3$ is selected as the foregoing perovskite type oxide, and at least one member selected from $Y_3Al_5O_{12}$, $Al_2Fe_3Y_3O_{12}$, and $Al_3Fe_2Y_3O_{12}$ is selected as the foregoing garnet type oxide, respectively by the powder X-ray diffraction analysis.

14 Claims, 8 Drawing Sheets

SINTERED COMPACT FOR THERMISTOR ELEMENT, PROCESS FOR PRODUCING THE SAME, THERMISTOR ELEMENT AND TEMPERATURE SENSOR

TECHNICAL FIELD

The present invention relates to a sintered body for a thermistor element having excellent temperature detecting performance in a wide temperature range and a process for producing the same, and to a thermistor element and a temperature sensor. More specifically, the invention relates to a sintered body for a thermistor having an maximum detectable temperature of approximately 1,000° C. and a minimum of preferably lower than 300° C. and having a small dispersion of B-value among individuals and a process for producing the same, and to a thermistor element and a temperature sensor.

BACKGROUND ART

In applying electronic instruments to temperature compensation and temperature detection, thermistor elements have hitherto been widely used. In the case where a thermistor element is used for temperature detection, properties which the sintered body constituting the thermistor element is required to have are (1) a small B-value; (2) the change of resistance during the thermal history of the element is small; and (3) the dispersion of resistance value and of B-value are small. The B-value as referred to herein is an index to express a change of resistance in a prescribed temperature range, and the smaller the value, the smaller the change of resistance with change in temperature. Then, a thermistor element formed of this sintered body having the foregoing properties has (1) a wide temperature detection range, (2) excellent heat resistance, and (3) excellent precision of temperature detection.

As the sintered body for a thermistor element, there is disclosed a sintered body containing (Y, Sr) (Cr, Fe, Ti)$O_3$ as the major component and exhibiting stable resistance in the temperature region of from 300 to 1,000° C. (for example, Japanese Patent No. 3,254,595). The temperature dependent resistance characteristics of the sintered body for thermistor element as disclosed in this Japanese Patent No. 3,254,595 are that the resistance value is about 100 kΩ at 300° C. and about 80 Ω at 900° C., and that the B-value at from 300 to 1,000° C. is about 8,000 K. However, since the sintered body contains Ti as the constituent element, the B-value tends to become large, and the resistance value at temperatures not higher than 200° C. is large, on the order of MΩ, so that it is indistinguishable from insulation resistance, and temperature detection cannot be achieved.

Incidentally, by changing the proportion of elements constituting the foregoing composition, for example, it is possible to adjust the resistance value at 100° C. to be not more than 500 kΩ, the value at which it is distinguishable from insulation resistance, so that temperature in the vicinity of 100° C. can be detected. However, since the Cr element as the constituent element is readily volatile, there was encountered a problem that the B-value varies among individual elements (thermistor sintered bodies) according to the amount of volatilization.

Also, there are disclosed sintered bodies for thermistor elements containing [Y(Cr, Mn)$O_3$+$Y_2O_3$] as the major components (see, for example, JP-A-11-251108 and JP-A-2002-124403). Since these sintered bodies contain Cr, a dispersion of the B-value among the individual sintered bodies is inevitable.

In the light of the above, there is demand for a sintered body for thermistor element having excellent temperature detecting performance in the temperature range of, approximately 100 to 1,000° C., preferably lower than 300° C., and having a small dispersion of a B-value among individual elements.

DISCLOSURE OF THE INVENTION

The invention is to solve the foregoing conventional problems and is aimed to provide a sintered body for thermistor element having a small dispersion of a B-value among individuals and capable of detecting a temperature of from the vicinity of 300° C. to approximately 1,000° C., and further a sintered body for thermistor elements in which by adjusting the contents of constituent elements at prescribed amounts, the minimum detection temperature is made to be approximately 100° C., the difference in the resistances at the beginning and the end of the thermal history is small, and its endurance is excellent, and a process for producing the same, and a thermistor element and further a temperature sensor.

The invention is to attain the foregoing aim and achieved as follows.

1. A sintered body for thermistor elements containing Sr, Y, Mn, A, Fe, and O, which is characterized in that not only crystal phases of a perovskite type oxide and a garnet type oxide are contained, but also a crystal phase of an Sr—Al based oxide or an Sr—Fe based oxide or both is contained.

2. The sintered body for thermistor elements as set forth above in 1, wherein $FeYO_3$ and/or $AlYO_3$ is selected as the foregoing perovskite type oxide, and at least one member selected from the group consisting of $Y_3Al_5O_{12}$, $Al_2Fe_3Y_3O_{12}$, and $Al_3Fe_2Y_3O_{12}$ is selected as the foregoing garnet type oxide, respectively by the powder X-ray diffraction analysis.

3. The sintered body for thermistor element as set forth above in 1, wherein among sites on the foregoing perovskite type oxide and/or the foregoing garnet type oxide, there is Sr solid solution in the Y site, Mn and/or Fe solid solution in the Al site, and Al and/or Mn solid solution in the Fe site.

4. The sintered body for thermistor element as set forth above in 1, wherein when the mole number of Sr is defined as x, the mole number of Y is defined as (1−x), the mole number of Mn is defined as y, the mole number of Al is defined as z, and the mole number of Fe is defined as (1−y−z), x, y and z are within the ranges $0.090 \leq x \leq 0.178$, $0.090 \leq y \leq 0.178$, $z \geq 0.275$, and $(1-y-z) \geq 0.025$.

5. The sintered body for thermistor element as set forth above in 1, which further contains Si.

6. The sintered body for thermistor elements as set forth above in 5, wherein $FeYO_3$ and/or $AlYO_3$ is selected as the foregoing perovskite type oxide, and at least one member selected from the group consisting of $Y_3Al_5O_{12}$, $Al_2Fe_3Y_3O_{12}$, and $Al_3Fe_2Y_3O_{12}$ is selected as the foregoing garnet type oxide, by powder X-ray diffraction analysis.

7. The sintered body for thermistor element as set forth above in 5, wherein among the sites in the foregoing perovskite type oxide and/or the foregoing garnet type oxide, there is Sr solid solution in the Y site, Mn and/or Fe solid solution in the Al site, and Al and/or Mn solid solution in the Fe site.

8. The sintered body for thermistor element as set forth above in 5, wherein when the mole number of Sr is defined as x, the mole number of Y is defined as (1−x), the mole number of Mn is defined as y, the mole number of Al is defined as z, and the mole number of Fe is defined as (1−y−z), x, y and z have the relationship of $0.090 \leq x \leq 0.178$, $0.090 \leq y \leq 0.178$, $z \geq 0.275$, and $(1-y-z) \geq 0.025$.

9. A process for producing a sintered body for thermistor element, which is characterized by mixing various raw material powders containing Sr, Y, Mn, Al, and Fe and calcining the mixture to form a calcined powder; subsequently molding a thermistor forming powder of a mixture of this calcined powder with a sintering assistant containing at least elemental Si; and then calcining the resulting molded compact to obtain a sintered body for thermistor elements containing not only crystal phases of a perovskite type oxide and a garnet type oxide but also a crystal phase an Sr—Al based oxide or an Sr—Fe based oxide or both.

10. A process for producing a sintered body for thermistor elements, which is characterized by mixing respective raw material powders substantially free of elemental Si and containing elemental Sr, Y, Mn, Al, and Fe and calcining the mixture to form a calcined powder; subsequently molding a thermistor forming powder obtained by pulverizing this calcined powder; and then calcining the resulting molded compact to obtain a sintered body for thermistor elements containing not only crystal phases of a perovskite type oxide and a garnet type oxide but also a crystal phase of an Sr—Al based oxide or an Sr—Fe based oxide or both, and substantially free of Si.

11. A thermistor element, which is characterized by using a sintered body containing Sr, Y, Mn, Al, Fe, and O for the thermistor element, wherein not only crystal phases of a perovskite type oxide and a garnet type oxide are contained, but also a crystal phase of an Sr—Al based oxide or an Sr—Fe based oxide or both is contained.

12. A temperature sensor, which is characterized by using a sintered body containing Sr, Y, Mn, Al, Fe, and O for the thermistor element, wherein not only crystal phases of a perovskite type oxide and a garnet type oxide are contained, but also a crystal phase of an Sr—Al based oxide or an Sr—Fe based oxide or both is contained.

BEST MODE FOR CARRYING OUT THE INVENTION

The sintered body for thermistor element of the invention contains Sr, Y, Mn, Al, Fe, and O, wherein not only crystal phases of a perovskite type oxide and a garnet type oxide are contained, but also a crystal phase of an Sr—Al based oxide or an Sr—Fe based oxide or both is contained. Namely, since the sintered body for thermistor element of the invention is of a construction containing neither a Ti element nor a readily volatile Cr element, not only is the B-value made small, but also in the case of mass production, the dispersion of the B-value among individual sintered bodies for thermistor elements (and thus individual thermistor elements) can be made small. As a result, it is possible to form a sintered body for thermistor elements capable of achieving the temperature detection within the range from 300° C. or lower to approximately 1,000° C. Incidentally, though it is desirable that elemental Cr and Ti are not contained at all, inevitably there are cases where these elements are contained as impurities in the raw material to be used for the production or are incorporated at the time of production or the like, so there is some possibility that they are contained. For that reason, the case where neither Cr element nor Ti element is detected as a result of surface analysis of a sintered body for the thermistor element by EDS (for example, the case of measurement using a scanning electron microscope "JED-2110 Model", manufactured by JEOL LTD. at an acceleration voltage of 20 kV) is defined as "not containing" in this specification. Also, the sintered body for thermistor element of the invention can be formed containing elemental Si. However, the sintered body for thermistor element of the invention can be formed without elemental Si. Incidentally, with respect to this Si element, there is inevitably some possibility that elemental Si is contained e.g. as an impurity in the raw material used in the production. Accordingly, in the invention, the case where elemental Si is detected in the chemical analysis of the sintered body for thermistor elements, but its content converted to the oxide of Si is less than 0.3% by weight is defined as "substantially free from Si".

The foregoing perovskite type oxide is an oxide having a site where Y and/or Sr is disposed and a site where at least one member selected from among Al, Mn and Fe is disposed; specific examples are $FeYO_3$, $AlYO_3$, $MnYO_3$, $YFeO_3$, $YAlO_3$, and $YMnO_3$. Also, in the foregoing perovskite type oxide, two or more elements having ion radius close to each other may form a solid solution. In that case, the perovskite type oxide can be for example $Y(Fe, Al)O_3$, $Y(Fe, Mn)O_3$, $Y(Mn, Al)O_3$, $Y(Fe, Mn, Al)O_3$, $(Y, Sr)FeO_3$, $(Y, Sr)AlO_3$, $(Y, Sr)MnO_3$, $(Y, Sr)(Fe, Al)O_3$, $(Y, Sr)(Fe, Mn)O_3$, $(Y, Sr)(Mn, Al)O_3$, and $(Y, Sr)(Fe, Mn, Al)O_3$. In the sintered body for thermistor elements of the invention, the oxides as enumerated above may be contained in the crystal phase of the perovskite type oxide singly or in combinations of two or more kinds thereof. Incidentally, in the foregoing $Y(Fe, Al)O_3$, "(Fe, Al)" means that either Fe or Al occupies one site and with the other there is formed a solid solution. This is the same hereinafter.

Also, the foregoing garnet type oxide has a site where Y and/or Sr is disposed and a site where at least one member selected from among Al, Mn and Fe is disposed; specific examples thereof include $Y_3Fe_5O_{12}$, $Y_3Al_5O_{12}$, and $Y_3Mn_5O_{12}$. Also, in the foregoing garnet type oxide, two or more elements having ion radius close to each other form a solid solution. In that case, the garnet type oxide can be for example $(Al, Fe)_5Y_3O_{12}$, $Y_3(Fe, Mn)_5O_{12}$, $Y_3(Mn, Al)_5O_{12}$, $Y_3(Fe, Mn, Al)_5O_{12}$, $(Y, Sr)_3Fe_5O_{12}$, $(Y, Sr)_3Al_5O_{12}$, $(Y, Sr)_3Mn_5O_{12}$, $(Y, Sr)_3(Fe, Al)_5O_{12}$, $(Y, Sr)_3(Fe, Mn)_5O_{12}$, $(Y, Sr)_3(Mn, Al)_5O_{12}$, and $(Y, Sr)_3(Fe, Mn, AL)_5O_{12}$, in which $Al_2Fe_3Y_3O_{12}$ and $Al_3Fe_2Y_3O_{12}$ are included. In the sintered body for thermistor elements of the invention, the oxides enumerated above may be contained in the crystal phase of the garnet type oxide singly or in combinations of two or more kinds thereof.

Incidentally, in the sintered body for thermistor elements, what crystal phases of the perovskite type oxide and the garnet type oxide are formed can be identified from powder X-ray diffraction analysis using a JCPDS card. That is, by collating the peak data of a crystal of the compound with corresponding chemical formulas as listed in the JCPDS card, the presence of a compound can be confirmed. Accordingly, the crystal phases of the above $FeYO_3$ and $AlYO_3$ perovskite type oxide and the crystal phases of the above $Y_3Al_5O_{12}$, $Al_2Fe_3Y_3O_{12}$, and $Al_3Fe_2Y_3O_{12}$ garnet type oxide can be also identified by the powder X-ray diffraction analysis. Also, two or more kinds of elements in solid solution in each site can be identified through the fact that the peaks of starting substances other than those of the targeted crystal structure are not present on the powder X-ray diffraction pattern or through the peak shift of the powder X-ray diffraction pattern of the targeted crystal structure.

The sintered body for thermistor elements of the invention contains a crystal phase of an Sr based oxide in addition to the crystal phases of the above oxides. Examples of this Sr based oxide include an Sr—Al based oxide and an Sr—Fe based oxide. These oxides may be contained singly or in combinations of two or more kinds thereof. Incidentally, the terms "Sr—Al based oxide" and "Sr—Fe based oxide" as referred to in this specification are general terms for all oxides containing an Sr element and an Al element and all oxides containing an Sr element and an Fe element, respectively and also include an Sr—Al—Fe based oxide and an Sr—Al—Fe—Mn based oxide. In this specification, when the sintered body for thermistor elements is subjected to surface analysis by EDS, if an average concentration of the Sr element and the Al element is detected to be higher than the average concentration of the other elements exclusive of these two elements, it is judged that the "crystal phase of an Sr—Al based oxide" is contained. This is the same with respect to the Sr—Fe based oxide.

When the mole number of Sr is defined as x, the mole number of Y is defined as (1−x), the mole number of Mn is defined as y, the mole number of Al is defined as z, and the mole number of Fe is defined as (1−y−z), a preferred composition of the elements constituting the sintered body for thermistor element of the invention is one in which x, y and z have are in the ranges $0.090 \leq x \leq 0.178$, $0.090 \leq y \leq 0.178$, $z \geq 0.275$, and $(1-y-z) \geq 0.025$. When x is less than 0.090 and y is less than 0.090, the initial resistance at 100° C. of the crystal becomes so large that it is substantially in an insulated state. On the other hand, when x is more than 0.178 and y is more than 0.178, the inside of the element becomes a structure having a lot of voids which lower the conductivity, and cause other characteristics to become unstable. Also, when z is less than 0.275, the crystal particles of the element are grown too large, whereby the dispersion of the initial resistance tends to become large. When (1−y−z) is less than 0.025, the change of resistance over the thermal history tends to become large.

In other words, by making the amounts of the foregoing elements fall within the prescribed ranges, it is possible to control the resistance value of the sintered body at 300° C. at not more than 500 kΩ and to control the resistance value at 900° C. to be 35 Ω or more. By controlling the foregoing resistance values, it is possible to form a sintered body for thermistor element having good temperature detecting performance within the range of from approximately 300° C. as the lower limit to approximately 1,000° C. as the upper limit. Also, by making the amounts of the foregoing elements fall within the prescribed ranges, it is possible to form a sintered body for thermistor elements which whose characteristics are stable over the thermal history and excellent in endurance.

Incidentally, the respective contents as described above are effective even in the case where Si is included.

In more preferred compositions of the foregoing elements, x, y and z are in the ranges $0.120 \leq x \leq 0.166$, $0.120 \leq y \leq 0.166$, $0.494 \leq z \leq 0.793$, $0.080 \leq (1-y-z)$, and $z/(1-y) \geq 0.55$. When the composition is within these ranges, the resistance value of the sintered body at 100° C. is kept at not more than 500 kΩ and the resistance value at 900° C. is kept at 50 Ω or more. By controlling the foregoing resistance values, it is possible to form a sintered body for thermistor elements having good temperature detecting performance within the range from approximately 100° C. as the lower limit to approximately 1,000° C. as the upper limit. Also, by making the amounts of the foregoing elements fall within the prescribed ranges, it is possible to form a sintered body for thermistor elements which whose characteristics are stable over the thermal history and excellent in endurance.

The mean particle size of the crystal particles constituting the sintered body for thermistor elements of the invention is preferably not more than 7 μm, more preferably from 0.1 to 7 μm, and still more preferably from 0.1 to 3 μm. When the mean particle size of the crystal particle is too large, a sintered body for a thermistor element which deviates from the desired material composition may be obtained, and the characteristics tend to become unstable.

According to the first production process of a sintered body for thermistor element of the invention, a raw material powder containing elemental Sr, Y, Mn, Al, and Fe are mixed; the mixture is calcined to form a calcined powder; and thereafter, a thermistor forming powder made of a mixture of this calcined powder and a sintering assistant containing at least elemental Si is molded. The thus obtained molded compact is calcined to obtain a sintered body for a thermistor element containing not only crystal phases of a perovskite type oxide and a garnet type oxide but also a crystal phase of an Sr—Al based oxide or an Sr—Fe based oxide or both.

First of all, raw material powders as starting materials, namely, respective compounds containing respective elements of Y, Sr, Fe, Mn, and Al such as powders of oxides, hydroxides, carbonates, sulfates, or nitrates—preferably powders of oxides or carbonates—are mixed by a method such as wet mixing and dried, and then calcined to form a calcined powder. Thereafter, this calcined powder and a sintering assistant are mixed and pulverized to obtain a "thermistor forming powder". Incidentally, in the case of using sulfates or nitrates, there is employed a measure in which the raw materials are dissolved and mixed in water, the solution is heated and polymerized, and the dried product is calcined to form a calcined powder.

Though the calcination condition is not particularly limited, the calcination is carried out at a temperature of preferably from 1,100 to 1,500° C., and more preferably from 1,150 to 1,450° C. for usually one hour or more, and preferably 1.5 hours or more. Also, though the calcination atmosphere is not particularly limited, it is usually the air.

The above sintering assistant may contain elemental Si, and examples thereof include $SiO_2$, $CaSiO_3$, and $SrSiO_3$. Of these, $SiO_2$ is preferable. Also, these can be used singly or in combinations of two or more kinds thereof. The relative amount of this Si element-containing sintering assistant is usually from 0.3 to 10 parts by weight, preferably from 0.3 to 5 parts by weight, and more preferably from 0.3 to 3 parts by weight, where 100 is the weight of the whole calcined powder. By making the blended amount fall within the foregoing range, it becomes possible to achieve sintering at low temperatures and to form a sintered body for element having a high strength and excellent high-temperature stability.

Also, though the mean particle size of each of the foregoing raw material powders and sintering assistant powder necessary for forming a sintered body for thermistor element is not particularly limited, it is usually from 0.5 to 2.0 μm, and preferably from 0.5 to 1.5 μm. When the particle size is too large, there is some possibility that the powders are not uniformly mixed, resulting in a cause that a dispersion of the thermistor element characteristics becomes large.

Also, the thermistor forming powder obtained by mixing the sintering assistant containing at least elemental Si with the calcined powder and pulverizing the mixture is also mixed with a binder and a solvent or water. The binder is not particularly limited, and examples thereof include polyvinyl alcohol and polyvinyl butyral. The relative amount of the foregoing binder is usually from 5 to 20% by weight, and preferably from 10 to 20% by weight based on the total amount of the foregoing powder components. Incidentally, the mean particle size of the foregoing thermistor forming powder during mixing with the foregoing binder is preferably not more than 2.0 μm. In this way, it is possible to achieve uniform mixing.

Next, the mixture is dried and granulated to obtain a molding powder having good fluidity which is suitable for die press molding. Then, this molding powder is molded into a prescribed shape. Thereafter, by calcining this molded compact, it is possible to obtain a sintered body for thermistor elements containing not only crystal phases of a perovskite type oxide and a garnet type oxide but also a crystal phase of an Sr—Al based oxide or an Sr—Fe based oxide or both. Though the calcining condition is not particularly limited, the temperature is preferably from 1,400 to 1,700° C., more preferably from 1,400 to 1,650° C., and more preferably from 1,400 to 1,600° C. By making the calcining temperature fall within the foregoing range, it is possible to suppress marked growth of crystal particles and to reduce the dispersion of the characteristics. The calcining time is usually from 1 to 5 hours, and preferably from 1 to 2 hours. Also, though the calcining atmosphere is not particularly limited, it is usually the air.

According to the second production process of a sintered body for thermistor element of the invention, respective raw material powders not substantially containing elemental Si and containing respective elements of Sr, Y, Mn, Al, and Fe are mixed and calcined to form a calcined powder; thereafter, a thermistor forming powder obtained by pulverizing this calcined powder is molded; and the resulting molded compact is then calcined to obtain a sintered body for thermistor element which contains not only respective crystal phases of a perovskite type oxide and a garnet type oxide but also a crystal phase of at least one of an Sr—Al based oxide and an Sr—Fe based oxide and which is substantially free of Si.

The steps in obtaining the foregoing calcined powder are the same as in the description regarding the foregoing first production process of a sintered body for thermistor element. In the second production process, the foregoing calcined powder is pulverized to form a thermistor forming powder. (However, sintering assistant containing elemental Si is not mixed in this.)

Thereafter, this thermistor forming powder is mixed with a binder and a solvent or water, and the resulting mixture is dried and granulated to obtain a molding powder, in the same manner as in the foregoing first production process of a sintered body for thermistor element. Next, this molding powder is molded and heat treated in the same manner as described above, to obtain a sintered body for thermistor elements.

Incidentally, the mean particle size of the raw material powders and the like are also the same as in the foregoing first production process of a sintered body for thermistor elements.

Also, in the case of making a thermistor element from the foregoing molding powder in the foregoing first and second production processes of a sintered body for thermistor elements, this molding powder is molded into a prescribed shape using a pair of electrodes (as the material constituting the electrodes, Pt and Pr/Rh alloys having excellent heat resistance and the like are preferable). Thereafter, by calcining this integrated molded compact, it is possible to form a thermistor element. The calcining temperature and the like are the same as described above. By making the calcining temperature fall within the foregoing range, it is also possible to suppress the deterioration of the materials constituting the electrode.

When the foregoing calcining is carried out by spreading elements within a sheath and putting a lid thereon, it is possible to suppress evaporation of the specific components. Also, by spreading plates made of a material such as Pt and Pt/Rh alloys on the bottom of a sheath or using a sheath made of the same material quality as the sintered body, or the like, it is possible to prevent diffusion of the components into the sheath.

The sintered body for thermistor elements of the invention or the foregoing thermistor element can be further subjected to heat treatment after the foregoing calcining, as the need arises. With respect to the condition thereof, for example, the temperature is from 800 to 1,100° C., preferably from 850 to 1,100° C., and more preferably from 900 to 1,100° C.; and the time is 30 hours or more, preferably 100 hours or more, and more preferably 200 hours or more. By carrying out the heat treatment at the specified temperature for the specified time, it is possible to further stabilize the temperature dependence of resistance of the sintered body for thermistor elements. Also, in the case of carrying out the heat treatment, the atmosphere may be the air or a special atmosphere other than the air. Further, the time from completion of the foregoing calcining treatment until the start of this heat treatment is not particularly limited, but it is preferable that the heat treatment is carried out after dropping of the temperature of the sintered body to room temperature.

One embodiment of the thermistor element obtained using the sintered body for thermistor elements of the invention is illustrated in FIG. 1. A thermistor element 2 is composed of a sintered body 1 for thermistor elements and a pair of electrodes 9, and one end of each of the electrodes 9 is embedded in the sintered body 1 serving as a thermistor element. The shape of the element is not particularly limited and may a disk, a rod, or a washer shape, in addition to a bead shape.

A temperature sensor of the invention is one prepared by using the foregoing sintered body for thermistor elements. Also, it may be one prepared by using a thermistor element in which electrodes are disposed in the sintered bodieserving as a thermistor element. One embodiment of the temperature sensor is illustrated in FIG. 2. FIG. 2 is a partial cross section side view showing the structure of a temperature sensor for detecting the temperature of an exhaust gas, provided in an automotive exhaust gas passage. This temperature sensor is one in which the thermistor element 2 is housed in a closed-end cylindrical metal tube 3. In the metal tube 3, its far end 3a is closed, and its proximal end 3b is opened. A flange 4 is argon welded to the proximal end 3b of the metal tube 3. A nut 5 having a hexagon nut portion 5 and a screw portion 5b is rotatably fitted around the flange 4. A joint 6 is argon welded to the proximal end 4a of the flange 4. A sheath 8 including a pair of sheath core wires 7 is disposed within the metal tube 3, the flange 4, and the joint 6. In the metal tube 3, the thermistor element 2 is connected to the sheath core wires 7 protruding toward a tip end side 8a of the sheath 8 via Pt/Rh alloy wires 9. A nickel oxide pellet 10 is disposed within the far end 3a of the metal tube 3. Also, cement 11 is filled in the space surrounding the thermistor element 2. In the joint 6, a pair of lead wire 13 are connected to the sheath core wires 7 protruding from the proximal end 8b of the sheath 8, via terminals 12. These lead wires 13 are inserted in an auxiliary ring 14 made of a heat resistant rubber. The sheath core wires 7 and the lead wires 13 are connected to each other by the caulking terminals 12.

BEST MODE FOR CARRYING OUT THE INVENTION

The invention will be specifically described below with reference to the following Examples and Comparative Examples, but it should be construed that the invention is not limited to these Examples in any way.

[1] Production of Thermistor Element:

EXAMPLES 1 TO 31

By using a $Y_2O_3$ powder (purity: 99.9% or more, mean particle size: 1.1 μm), an $SrCO_3$ powder (purity: 99.0% or more, mean particle size: 0.5 μm), an $Fe_2O_3$ powder (purity: 99.2% or more, mean particle size: 0.9 μm), an $MnO_2$ powder (purity: 99.0% or more, mean particle size: 1.2 μm), and an $Al_2O_3$ powder (purity: 99.5% or more, mean particle size: 0.6 μm) and defining the mole number of Sr as x, the mole number of Y as (1−x), the mole number of Mn as y, the mole number of Al as z, and the mole number of Fe as (1−y−z), respectively, the powders were weighed out so that x, y and z matched the values shown in Tables 1 to 3 and wet mixed. Thereafter, each of the mixtures was dried to form a powder, which was then calcined in the air at 1,400° C. for 2 hours. Next, 1 part by weight of a sintering assistant ($SiO_2$ powder having a mean particle size of 1.5 μm) was further added to 100 parts by weight of this calcined powder, and the mixture was wet pulverized and dried, thereby obtaining a thermistor forming powder.

Thereafter, 20 parts of a binder containing polyvinyl butyral as the major component was added to and mixed with 100 parts by weight of this thermistor forming powder, and the mixture was dried and granulated, thereby obtaining a granulated powder.

Figure 1:
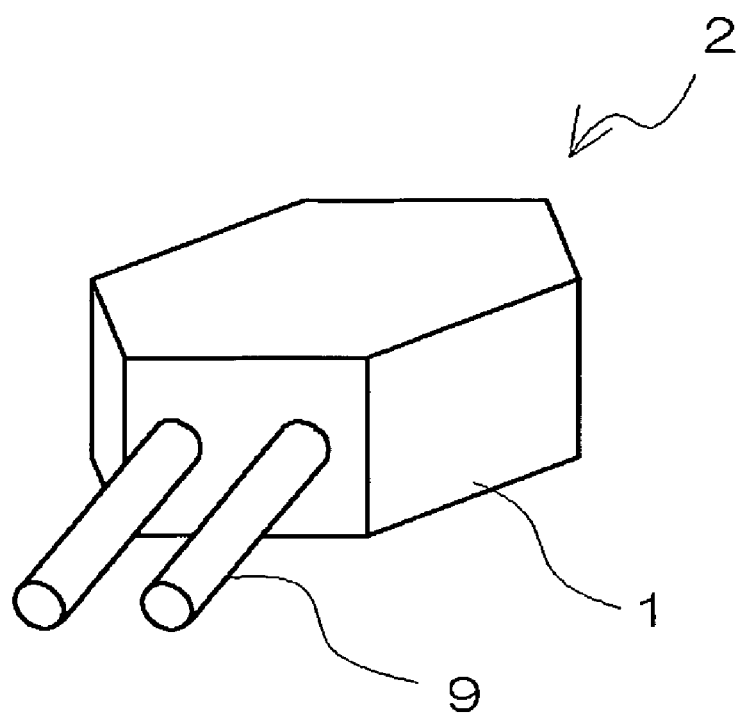
FIG. 1 is a schematic explanatory view to show one embodiment of a thermistor element.
Figure 2:
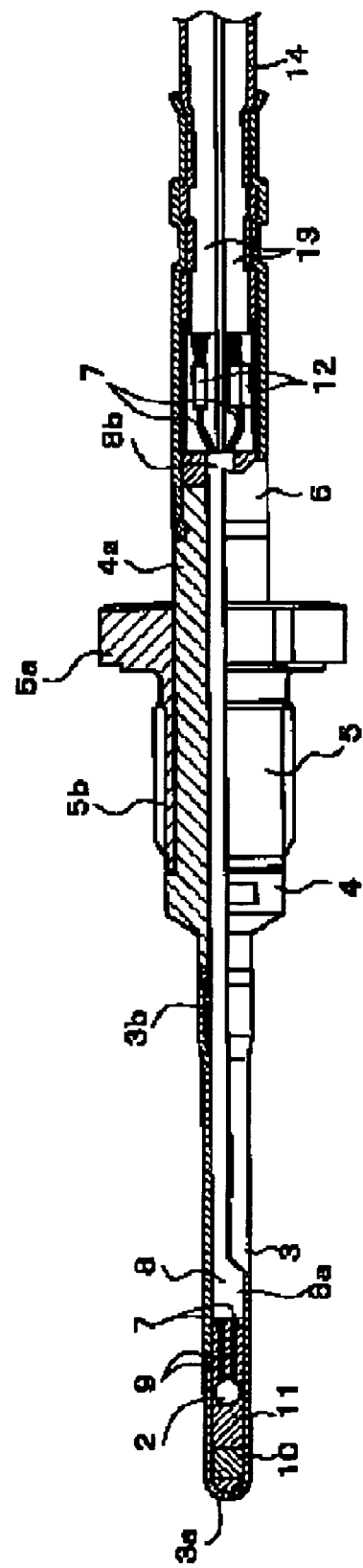
FIG. 2 is a schematic explanatory view to show one embodiment of a temperature sensor.

Next, this granulated powder was subjected to press molding (press pressure: 4,500 kg/cm$^3$) by the die molding method, thereby obtaining a molded compact having a hexagonal shape (thickness: 1.24 mm) having a pair of electrodes embedded in one side as illustrated in FIG. 1. The molded compact was calcined in the air at 1,550° C. for one hour. Thus were produced thermistor elements of Examples 1 to 31.

EXAMPLES 32 AND 33

By using a $Y_2O_3$ powder (purity: 99.9% or more, mean particle size: 1.1 μm), an $SrCO_3$ powder (purity: 99.0% or more, mean particle size: 0.5 μm), an $Fe_2O_3$ powder (purity: 99.2% or more, mean particle size: 0.9 μm), an $MnO_2$ powder (purity: 99.0% or more, mean particle size: 1.2 μm), and an $Al_2O_3$ powder (purity: 99.5% or more, mean particle size: 0.6 μm) and defining the mole number of Sr as x, the mole number of Y as (1−x), the mole number of Mn as y, the mole number of Al as z, and the mole number of Fe as (1−y−z), respectively, the powders were weighed out so that x, y and z matched the values shown in Table 3 and wet mixed. Thereafter, each of the mixtures was dried to form a powder, which was then calcined in the air at 1,400° C. for 2 hours. Next, this calcined powder was wet pulverized and dried, thereby obtaining a thermistor forming powder.

Thereafter, 20 parts of a binder containing polyvinyl butyral as the major component was added to and mixed with 100 parts by weight of this thermistor forming powder, and the mixture was dried and granulated, thereby obtaining a granulated powder.

Next, this granulated powder was subjected to press molding (press pressure: 4,500 kg/cm$^3$) by the die molding method, thereby obtaining a molded compact having a hexagonal shape (thickness: 1.24 mm) having a pair of electrodes embedded in one side as illustrated in FIG. 1. The molded compact was calcined in the air at 1,550° C. for one hour. There were thus produced thermistor elements of Examples 32 and 33. Incidentally, in Examples 32 and 33, though an extremely small amount of elemental Si was unavoidably contained in the raw material powders, a sintering assistant made of an $SiO_2$ powder was not added, in contrast to the foregoing Examples 1 to 31. Accordingly, the resulting thermistor elements (sintered bodies for thermistor element) are substantially free from elemental Si. Incidentally, having judged that in this specification there is not a substantial amount of elemental Si, the case where when elemental Si is less 0.3% by weight converted to its oxide was defined as "not a substantial amount".

COMPARATIVE EXAMPLE 1

A thermistor element was obtained in the same manner as in Example 1, except that by using a $Y_2O_3$ powder (purity: 99.9% or more, mean particle size: 1.1 μm), an $SrCO_3$ powder (purity: 99.0% or more, mean particle size: 0.5 μm), a $Cr_2O_3$ powder (purity: 99.3% or more, mean particle size: 0.5 μm), an $Fe_2O_3$ powder (purity: 99.2% or more, mean particle size: 0.9 μm), and a $TiO_2$ powder (purity: 99.2% or more, mean particle size: 1.8 μm) and defining the mole number of Sr as x, the mole number of Y as (1−x), the mole number of Fe as y, the mole number of Ti as z, and the mole number of Cr as (1−y−z), respectively, the powders were weighed out so that x, y and z matched the values shown in Table 3.

Figure 4:
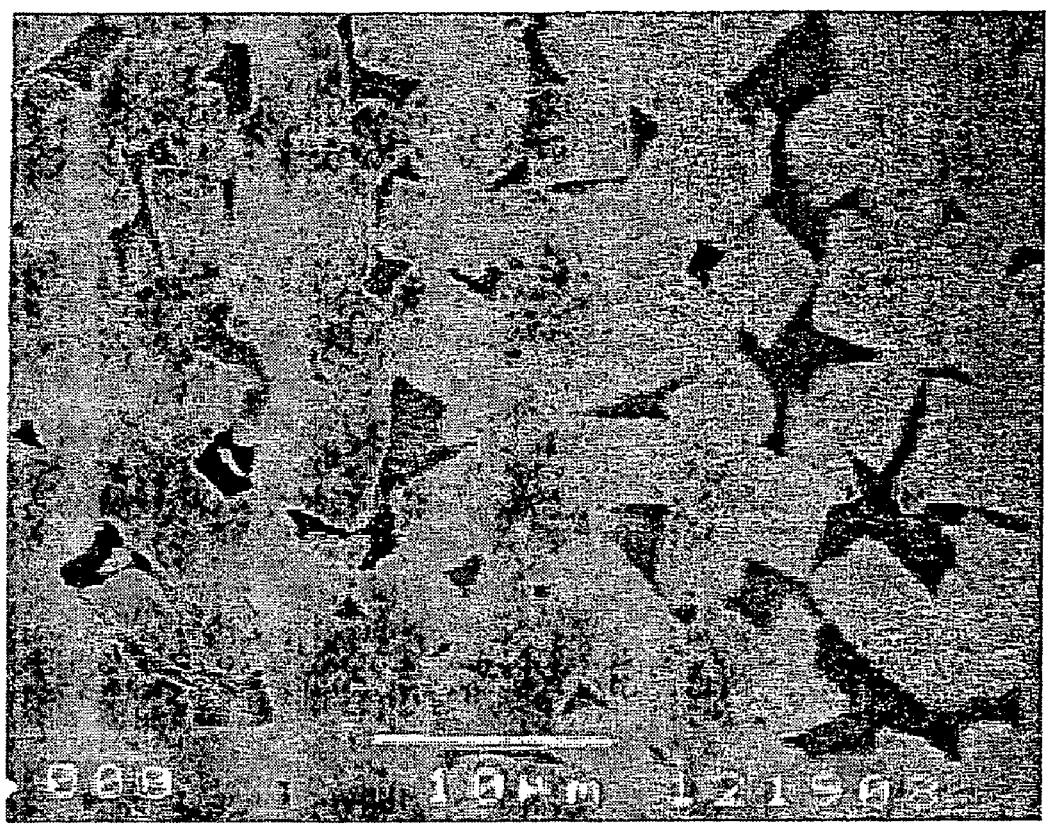
FIG. 4 is an explanatory view of an SEM image (reflected electron image) of the structure of a sintered body obtained in Example 4.
Figure 5:
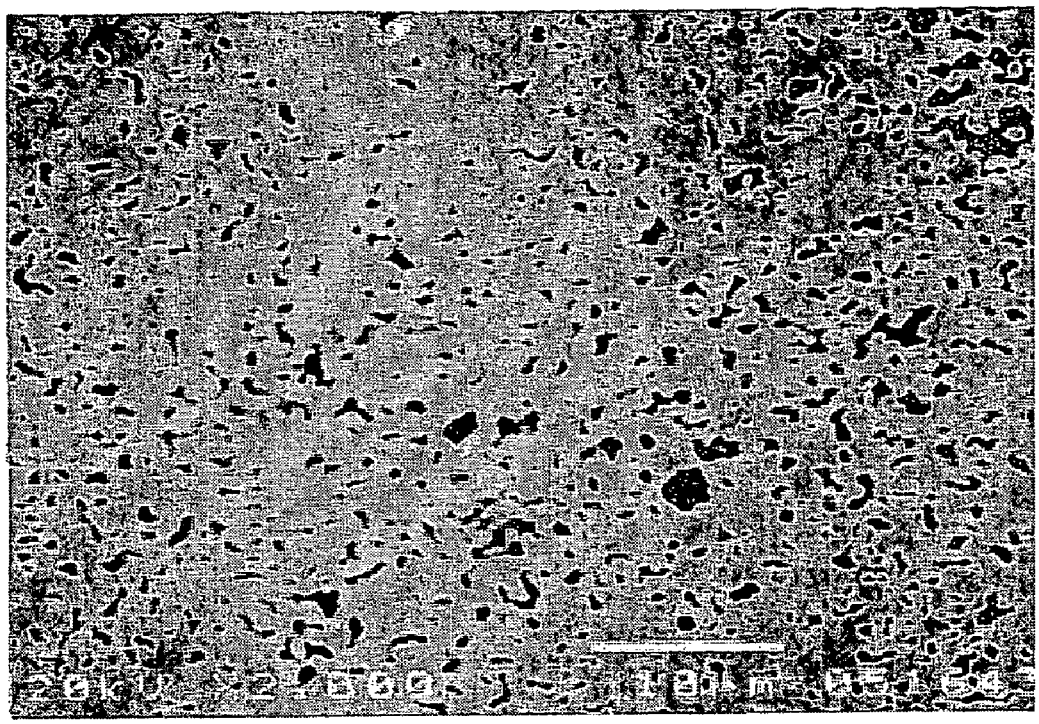
FIG. 5 is an explanatory view of an SEM image (reflected electron image) of the structure of a sintered body obtained in Example 18.

[2] Evaluation of Thermistor Element:

2-1. Observation of Structure:

The structure of the thermistor sintered body constituting each of thermistor elements obtained in Examples 1 to 33 was observed using a scanning electron microscope "JED-2110 Model", manufactured by JEOL LTD. at an acceleration voltage of 20 kV and a magnification of 2,000 times. From this observation, the mean particle size of crystal was calculated. The results obtained are shown in Tables 1 to 3. Also, examples of reflected electron images of the resulting structures regarding Examples 4 and 18 are shown in FIGS. 4 and 5, respectively.

Figure 6:
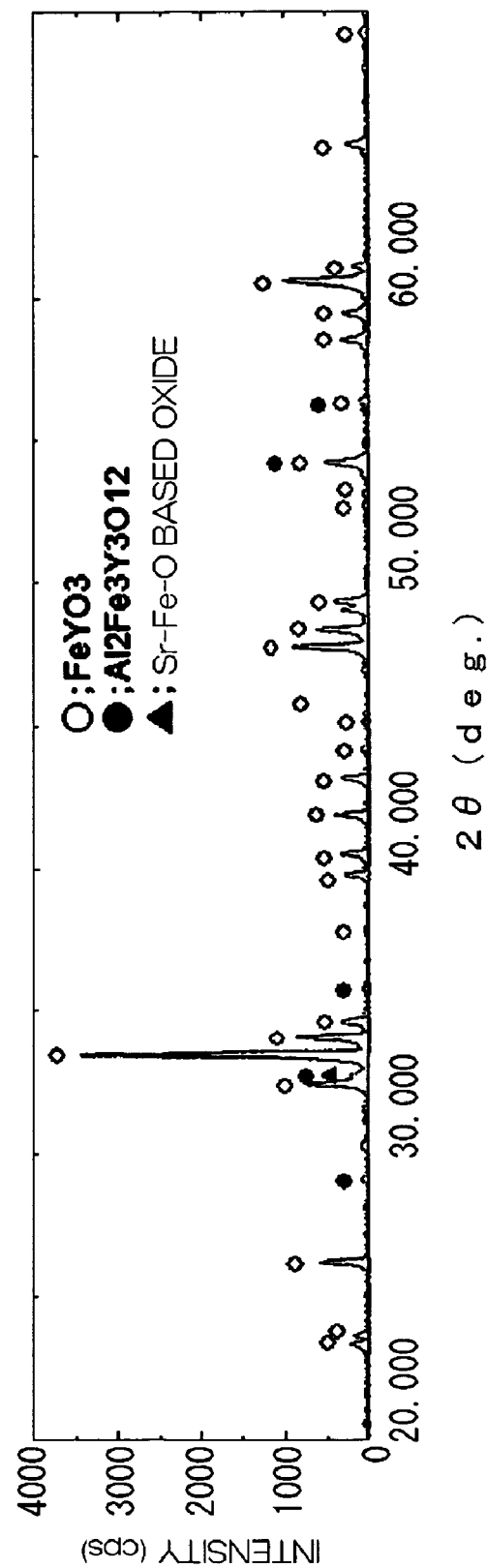
FIG. 6 is an explanatory view of a powder X-ray diffraction pattern of a sintered body obtained in Example 4.
Figure 7:
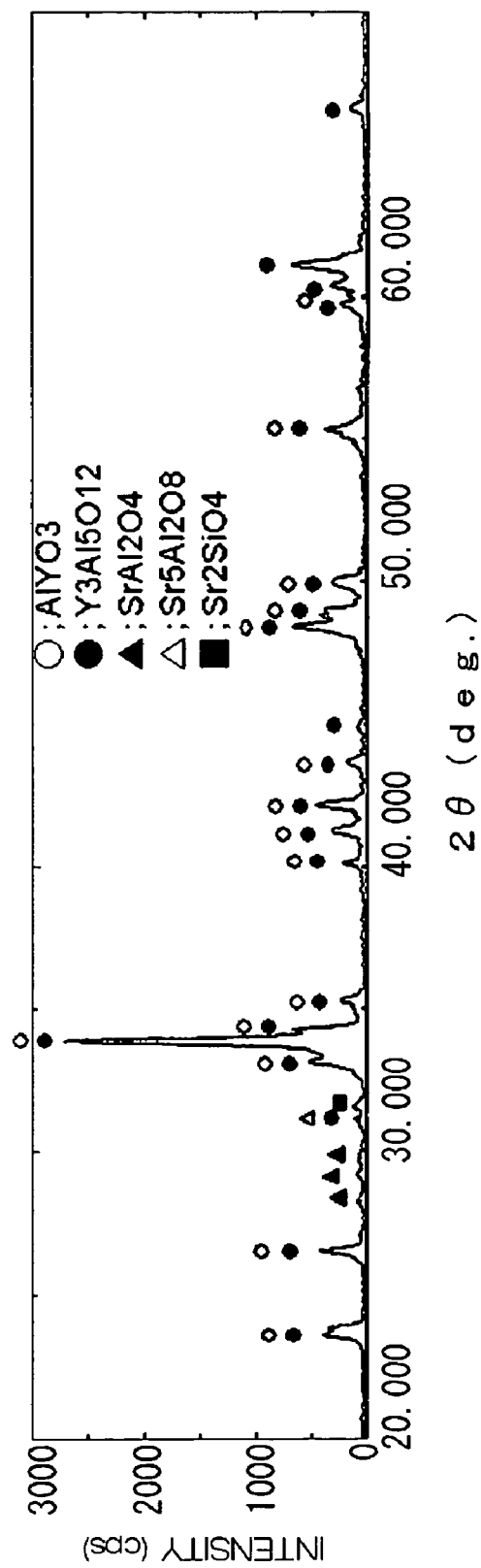
FIG. 7 is an explanatory view of a powder X-ray diffraction pattern of a sintered body obtained in Example 18.
Figure 8:
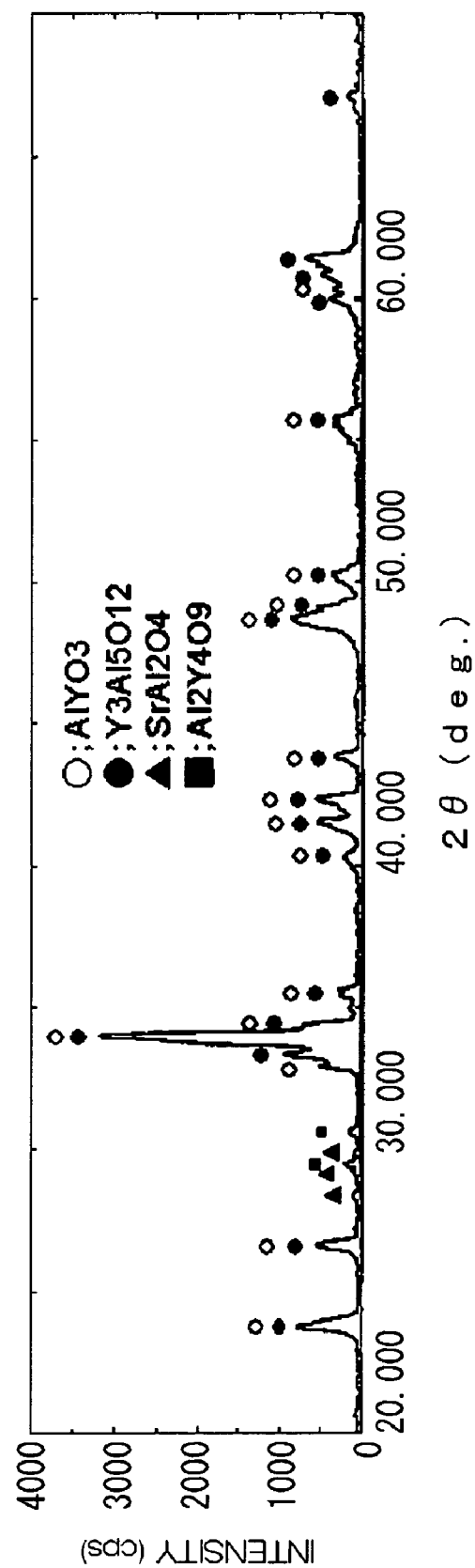
FIG. 8 is an explanatory view of a powder X-ray diffraction pattern of a sintered body obtained in Example 33.

2-2. Analysis of Crystal Phase:

The thermistor sintered body constituting each of thermistor elements obtained in Examples 1 to 33 was subjected to powder X-ray diffraction analysis and EDS analysis, thereby determining the crystal phase present in each sintered body. The results obtained are shown together in Tables 1 to 3. Also, examples of the X-ray diffraction patterns obtained from Examples 4, 18 and 33 are shown in FIGS. 6, 7 and 8, respectively. The identification of detected peaks was carried out using a JCPDS card.

TABLE 1

| Example | x | y | z | (1 − y − z) | Al/(Al + Fe) (%) | Mean particle size of crystal (μm) | Crystal phase of perovskite type compound | Crystal phase of garnet type compound | Other crystal phases |
|---|---|---|---|---|---|---|---|---|---|
| 1 | 0.116 | 0.116 | 0.227 | 0.657 | 26 | 10 | $FeYO_3$ | $Al_2Fe_3Y_3O_{12}$ | Sr—Al—O, Si—O, Sr—Fe—O, Sr—Y—O |
| 2 | 0.111 | 0.111 | 0.260 | 0.629 | 29 | 8 | $FeYO_3$ | $Al_2Fe_3Y_3O_{12}$ | Sr—Al—O, Si—O, Sr—Fe—O, Sr—Y—O |
| 3 | 0.106 | 0.106 | 0.291 | 0.602 | 33 | 7 | $FeYO_3$ | $Al_2Fe_3Y_3O_{12}$ | Sr—Al—O, Si—O, Sr—Fe—O, Sr—Y—O |
| 4 | 0.102 | 0.102 | 0.320 | 0.578 | 36 | 7 | $FeYO_3$ | $Al_2Fe_3Y_3O_{12}$ | Sr—Al—O, Si—O, Sr—Fe—O, Sr—Y—O |
| 5 | 0.098 | 0.098 | 0.346 | 0.556 | 38 | 5 | $FeYO_3$ | $Al_2Fe_3Y_3O_{12}$ | Sr—Al—O, Si—O, Sr—Fe—O, Sr—Y—O |
| 6 | 0.095 | 0.095 | 0.370 | 0.536 | 41 | 4 | $FeYO_3$ | $Al_2Fe_3Y_3O_{12}$ | Sr—Al—O, Si—O, Sr—Fe—O, Sr—Y—O |
| 7 | 0.110 | 0.110 | 0.370 | 0.520 | 42 | 4 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 8 | 0.221 | 0.221 | 0.369 | 0.410 | 47 | 4 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 9 | 0.192 | 0.192 | 0.451 | 0.357 | 56 | 3 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 10 | 0.181 | 0.181 | 0.484 | 0.336 | 59 | 3 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 11 | 0.170 | 0.170 | 0.513 | 0.316 | 62 | 3 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 12 | 0.106 | 0.106 | 0.414 | 0.480 | 46 | 4 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 13 | 0.126 | 0.126 | 0.494 | 0.380 | 57 | 3 | $FeYO_3$ | $Al_2Fe_3Y_3O_{12}$ | Sr—Al—O, Si—O, Sr—Fe—O, Sr—Y—O, Sr—Si—Y—O, Si—Sr—O |
| 14 | 0.149 | 0.149 | 0.581 | 0.270 | 68 | 1 | $AlYO_3$ | $Y_3Al_5O_{12}$ | Sr—Al—O, Si—O, Sr—Y—O, Sr—Si—Y—O, Si—Sr—O |

TABLE 2

| Example | x | y | z | (1 − y − z) | Al/(Al + Fe) (%) | Mean particle size of crystal (μm) | Crystal phase of perovskite type compound | Crystal phase of garnet type compound | Other crystal phases |
|---|---|---|---|---|---|---|---|---|---|
| 15 | 0.161 | 0.161 | 0.629 | 0.210 | 75 | ≤1 | $AlYO_3$ | $Y_3Al_5O_{12}$ | Sr—Al—O, Si—O, Sr—Y—O, Sr—Si—Y—O, Si—Sr—O |
| 16 | 0.175 | 0.175 | 0.685 | 0.140 | 83 | ≤1 | $AlYO_3$ | $Y_3Al_5O_{12}$ | Sr—Al—O, $Al_2Y_4O_9$, Si—O, Sr—Y—O, Sr—Si—Y—O, Si—Sr—O |
| 17 | 0.148 | 0.148 | 0.672 | 0.180 | 79 | ≤1 | $AlYO_3$ | $Y_3Al_5O_{12}$ | Sr—Al—O, Si—O, Sr—Y—O, Sr—Si—Y—O, Si—Sr—O |
| 18 | 0.157 | 0.157 | 0.713 | 0.130 | 85 | ≤1 | $AlYO_3$ | $Y_3Al_5O_{12}$ | Sr—Al—O, Si—O, Sr—Y—O, Sr—Si—Y—O, Si—Sr—O |
| 19 | 0.160 | 0.160 | 0.730 | 0.110 | 87 | ≤1 | $AlYO_3$ | $Y_3Al_5O_{12}$ | Sr—Al—O, Si—O, Sr—Y—O, Sr—Si—Y—O, Si—Sr—O |
| 20 | 0.162 | 0.162 | 0.738 | 0.100 | 88 | ≤1 | $AlYO_3$ | $Y_3Al_5O_{12}$ | Sr—Al—O, Si—O, Sr—Y—O, Sr—Si—Y—O, Si—Sr—O |
| 21 | 0.164 | 0.164 | 0.746 | 0.090 | 89 | ≤1 | $AlYO_3$ | $Y_3Al_5O_{12}$ | Sr—Al—O, Si—O, Sr—Y—O, Sr—Si—Y—O, Si—Sr—O |
| 22 | 0.166 | 0.166 | 0.754 | 0.080 | 90 | ≤1 | $AlYO_3$ | $Y_3Al_5O_{12}$ | Sr—Al—O, Si—O, Sr—Y—O, Sr—Si—Y—O, Si—Sr—O |
| 23 | 0.153 | 0.153 | 0.767 | 0.080 | 91 | ≤1 | $AlYO_3$ | $Y_3Al_5O_{12}$ | Sr—Al—O, Si—O, Sr—Y—O, Sr—Si—Y—O, Si—Sr—O |
| 24 | 0.140 | 0.140 | 0.780 | 0.080 | 91 | ≤1 | $AlYO_3$ | $Y_3Al_5O_{12}$ | Sr—Al—O, Si—O, Sr—Y—O, Sr—Si—Y—O, Si—Sr—O |

TABLE 3

| Example | x | y | z | (1 − y − z) | Al/(Al + Fe) (%) | Mean particle size of crystal (μm) | Crystal phase of perovskite type compound | Crystal phase of garnet type compound | Other crystal phases |
|---|---|---|---|---|---|---|---|---|---|
| 25 | 0.127 | 0.127 | 0.793 | 0.080 | 91 | ≤1 | $AlYO_3$ | $Y_3Al_5O_{12}$ | Sr—Al—O, Si—O, Sr—Y—O, Sr—Si—Y—O, Si—Sr—O |
| 26 | 0.084 | 0.084 | 0.836 | 0.080 | 91 | 2 | $AlYO_3$ | $Y_3Al_5O_{12}$ | Sr—Al—O, Si—O, Sr—Y—O, Sr—Si—Y—O, Si—Sr—O |
| 27 | 0.173 | 0.173 | 0.787 | 0.040 | 95 | ≤1 | $AlYO_3$ | $Y_3Al_5O_{12}$ | Sr—Al—O, $Al_2Y_4O_9$, Si—O, Sr—Y—O, Sr—Si—Y—O, Si—Sr—O |

TABLE 3-continued

| Example | x | y | z | (1 − y − z) | Al/(Al + Fe) (%) | Mean particle size of crystal (μm) | Crystal phase of perovskite type compound | Crystal phase of garnet type compound | Other crystal phases |
|---|---|---|---|---|---|---|---|---|---|
| 28 | 0.087 | 0.087 | 0.873 | 0.040 | 96 | 1 | $AlYO_3$ | $Y_3Al_5O_{12}$ | Sr—Al—O, Si—O, Sr—Y—O, Sr—Si—Y—O, Si—Sr—O |
| 29 | 0.071 | 0.071 | 0.889 | 0.040 | 96 | 2 | $AlYO_3$ | $Y_3Al_5O_{12}$ | Sr—Al—O, Si—O, Sr—Y—O, Sr—Si—Y—O, Si—Sr—O |
| 30 | 0.046 | 0.046 | 0.914 | 0.040 | 96 | 4 | $AlYO_3$ | $Y_3Al_5O_{12}$ | Sr—Al—O, Si—O, Sr—Y—O, Sr—Si—Y—O, Si—Sr—O |
| 31 | 0.137 | 0.137 | 0.853 | 0.010 | 99 | 1 | $AlYO_3$ | $Y_3Al_5O_{12}$ | Sr—Al—O, Si—O, Sr—Y—O, Sr—Si—Y—O, Si—Sr—O |
| 32 | 0.173 | 0.173 | 0.787 | 0.040 | 95 | ≦1 | $AlYO_3$ | $Y_3Al_5O_{12}$ | Sr—Al—O, $Al_2Y_4O_9$ |
| 33 | 0.140 | 0.173 | 0.787 | 0.040 | 95 | ≦1 | $AlYO_3$ | $Y_3Al_5O_{12}$ | Sr—Al—O, $Al_2Y_4O_9$ |
| Comparative Example 1 | 0.070 | 0.219 | 0.050 | 0.731 | — | 3 | — | — | — |

(Note)
In Comparative Example 1, x, y, z, and (1 − y − z) represent the mole numbers of Sr, Fe, Ti, and Cr, respectively.

2-3. Performance Test (Measurement of Resistance Value and Measurement of B-Value and Dispersion of B-Value)

Initial resistance values (kΩ) of fifty thermistor elements obtained in Examples 1 to 33 and Comparative Example 1 were measured at 100, 300, 600 and 900° C., respectively. Then, B-values (K) were calculated according to the following expression (1) from the obtained resistance values. Numerical values shown in the tables are a characteristic of the element corresponding to the central value of the 50 samples, taken to be the representative value of that Example.

$$B\text{-value} = \ln(R/R_0)/(1/T - 1/T_0) \quad (1)$$

R: Resistance value (kΩ) at the time of absolute temperature T (K)

$R_0$: Resistance value (kΩ) at the time of absolute temperature $T_0$ (K)

Incidentally, T is an absolute temperature higher than $T_0$.

Also, with respect to the dispersion of the B-value observed in the range from 100 to 900° C., the degree of dispersion 3σ of the 50 sample data from the mean of the B-values was calculated according to the following expression (2).

$$[\text{Dispersion of } B\text{-value (\%)}] = 3\sigma/(\text{average value}) \quad (2)$$

Figure 3:
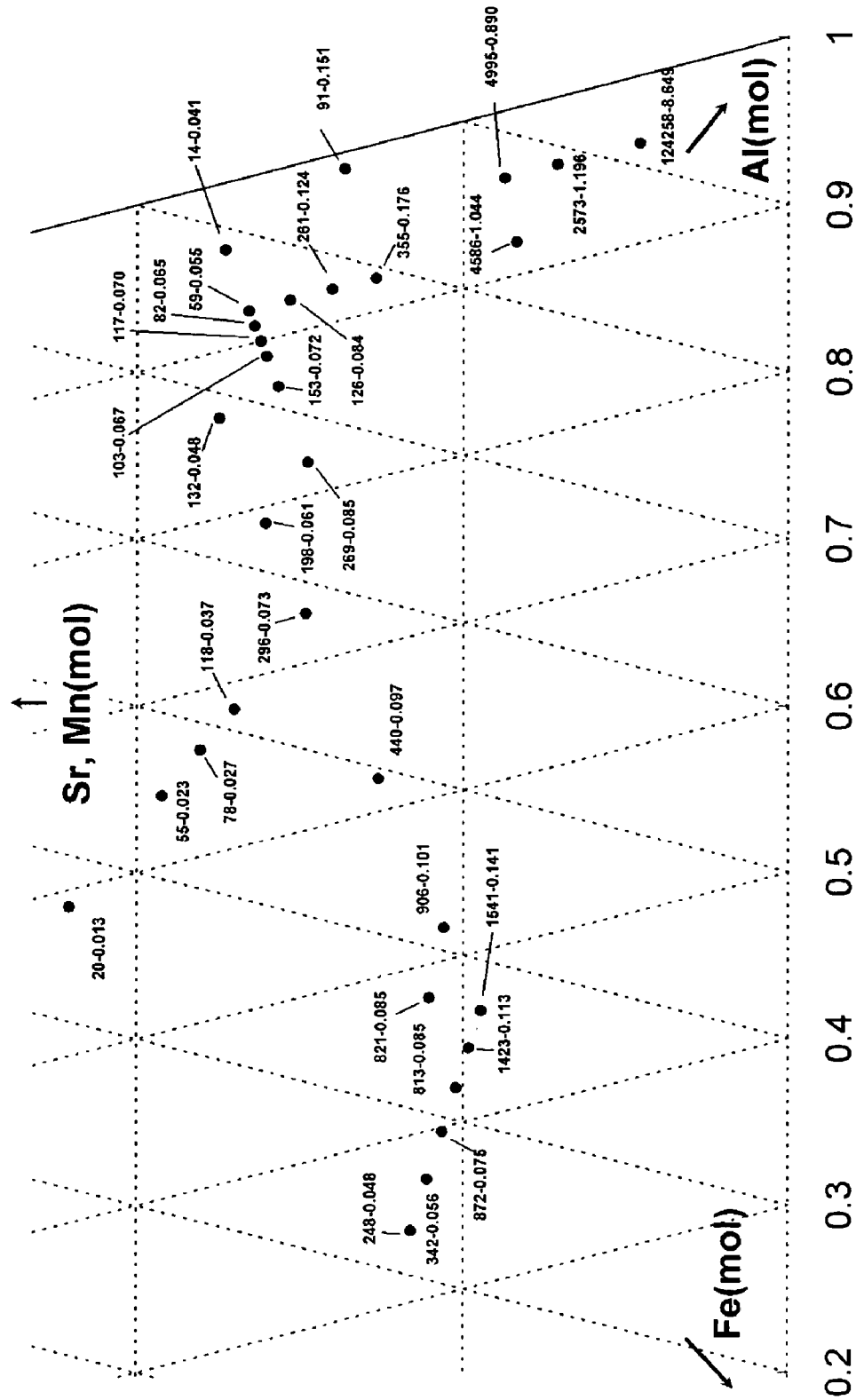
FIG. 3 shows compositions of sintered bodies for thermistor element of Examples 1 to 33 through their locations in a three-component constitutional diagram. The mole number of Fe is shown through displacement from the center toward the lower left, the mole number of Al is shown through displacement from the center toward the lower right, and the mole number of Sr or Mn is shown through displacement from the center upward.

The results obtained are shown in Tables 4 to 6. Also, a three-component constitutional diagram obtained by plotting each of the samples in every composition is shown in FIG. 3. The two numerical values written near each plot are initial resistance values at 100° C. and 900° C. Incidentally, plots of Examples 32 and 33 are not given in FIG. 3.

TABLE 4

| | | Resistance value (kΩ) | | | | B-Value | | | Dispersion of B-value at the beginning (%) |
|---|---|---|---|---|---|---|---|---|---|
| | | 100° C. | 300° C. | 600° C. | 900° C. | B100-300 | B300-600 | B600-900 | |
| Example 1 | At the beginning | 243.9 | 3.890 | 0.249 | 0.048 | 4423 | 4584 | 5588 | 2.0 |
| | After heating | 377.8 | 4.884 | 0.258 | 0.049 | 4647 | 4902 | 5677 | |
| Example 2 | At the beginning | 342.4 | 5.155 | 0.303 | 0.056 | 4484 | 4723 | 5790 | 1.5 |
| | After heating | 480.4 | 6.150 | 0.319 | 0.057 | 4657 | 4936 | 5891 | |
| Example 3 | At the beginning | 872.2 | 9.868 | 0.486 | 0.075 | 4789 | 5020 | 6359 | 1.0 |
| | After heating | 697.3 | 8.468 | 0.452 | 0.073 | 4714 | 4886 | 6233 | |
| Example 4 | At the beginning | 813.1 | 10.53 | 0.549 | 0.085 | 4645 | 4924 | 6359 | 0.8 |
| | After heating | 814.6 | 10.50 | 0.560 | 0.089 | 4651 | 4886 | 6275 | |
| Example 5 | At the beginning | 1423 | 17.03 | 0.807 | 0.113 | 4730 | 5084 | 6701 | 0.8 |
| | After heating | 1325 | 16.04 | 0.790 | 0.114 | 4717 | 5020 | 6621 | |
| Example 6 | At the beginning | 1541 | 19.72 | 0.987 | 0.141 | 4658 | 4994 | 6635 | 0.8 |
| | After heating | 1578 | 20.64 | 1.034 | 0.148 | 4635 | 4992 | 6644 | |
| Example 7 | At the beginning | 821.0 | 10.37 | 0.519 | 0.085 | 4672 | 4994 | 6182 | 0.8 |
| | After heating | 800.0 | 9.738 | 0.504 | 0.084 | 4711 | 4938 | 6119 | |
| Example 8 | At the beginning | 19.56 | 0.396 | 0.035 | 0.013 | 4168 | 4034 | 3314 | 0.8 |
| | After heating | 43.40 | 0.673 | 0.036 | 0.014 | 4453 | 4866 | 3378 | |
| Example 9 | At the beginning | 55.39 | 0.964 | 0.073 | 0.023 | 4330 | 4311 | 3958 | 0.7 |
| | After heating | 93.83 | 1.422 | 0.074 | 0.023 | 4477 | 4927 | 4010 | |
| Example 10 | At the beginning | 78.24 | 1.322 | 0.094 | 0.027 | 4361 | 4407 | 4232 | 0.6 |
| | After heating | 104.2 | 1.684 | 0.098 | 0.027 | 4408 | 4747 | 4337 | |
| Example 11 | At the beginning | 118.4 | 2.055 | 0.140 | 0.037 | 4332 | 4474 | 4587 | 0.6 |
| | After heating | 114.5 | 1.993 | 0.138 | 0.036 | 4329 | 4448 | 4573 | |

TABLE 5

| | | Resistance value (kΩ) | | | | B-Value | | | Dispersion of B-value at the beginning (%) |
|---|---|---|---|---|---|---|---|---|---|
| | | 100° C. | 300° C. | 600° C. | 900° C. | B100-300 | B300-600 | B600-900 | |
| Example 12 | At the beginning | 906.2 | 11.41 | 0.594 | 0.101 | 4675 | 4927 | 6034 | 0.8 |
| | After heating | 924.8 | 11.65 | 0.613 | 0.105 | 4675 | 4910 | 6026 | |
| Example 13 | At the beginning | 439.5 | 7.652 | 0.470 | 0.097 | 4329 | 4653 | 5391 | 0.5 |
| | After heating | 383.6 | 7.234 | 0.461 | 0.097 | 4243 | 4589 | 5320 | |
| Example 14 | At the beginning | 296.2 | 4.707 | 0.301 | 0.073 | 4426 | 4583 | 4838 | 0.4 |
| | After heating | 297.5 | 4.753 | 0.305 | 0.074 | 4421 | 4580 | 4846 | |
| Example 15 | At the beginning | 197.9 | 3.397 | 0.232 | 0.061 | 4344 | 4477 | 4577 | 0.3 |
| | After heating | 194.1 | 3.373 | 0.230 | 0.060 | 4331 | 4474 | 4613 | |
| Example 16 | At the beginning | 132.1 | 2.548 | 0.179 | 0.048 | 4220 | 4430 | 4483 | 0.3 |
| | After heating | 131.0 | 2.543 | 0.181 | 0.049 | 4212 | 4409 | 4472 | |
| Example 17 | At the beginning | 268.6 | 4.893 | 0.334 | 0.085 | 4280 | 4474 | 4668 | 0.3 |
| | After heating | 264.5 | 4.793 | 0.330 | 0.085 | 4286 | 4460 | 4616 | |
| Example 18 | At the beginning | 153.1 | 3.381 | 0.260 | 0.072 | 4074 | 4276 | 4369 | 0.3 |
| | After heating | 147.1 | 3.280 | 0.256 | 0.071 | 4064 | 4252 | 4359 | |
| Example 19 | At the beginning | 102.9 | 2.664 | 0.227 | 0.067 | 3904 | 4104 | 4182 | 0.3 |
| | After heating | 94.63 | 2.533 | 0.223 | 0.066 | 3861 | 4065 | 4137 | |
| Example 20 | At the beginning | 117.1 | 2.878 | 0.239 | 0.070 | 3960 | 4150 | 4197 | 0.3 |
| | After heating | 110.7 | 2.823 | 0.239 | 0.071 | 3921 | 4115 | 4163 | |
| Example 21 | At the beginning | 81.71 | 2.370 | 0.215 | 0.065 | 3784 | 4002 | 4073 | 0.3 |
| | After heating | 74.93 | 2.268 | 0.211 | 0.065 | 3738 | 3959 | 4031 | |
| Example 22 | At the beginning | 59.31 | 1.872 | 0.177 | 0.055 | 3693 | 3936 | 3989 | 0.3 |
| | After heating | 54.51 | 1.782 | 0.173 | 0.055 | 3655 | 3835 | 3946 | |

TABLE 6

| | | Resistance value (kΩ) | | | | B-Value | | | Dispersion of B-value at the beginning (%) |
|---|---|---|---|---|---|---|---|---|---|
| | | 100° C. | 300° C. | 600° C. | 900° C. | B100-300 | B300-600 | B600-900 | |
| Example 23 | At the beginning | 125.5 | 3.389 | 0.289 | 0.084 | 3860 | 4104 | 4204 | 0.3 |
| | After heating | 110.3 | 3.152 | 0.280 | 0.083 | 3800 | 4037 | 4147 | |
| Example 24 | At the beginning | 261.4 | 5.974 | 0.455 | 0.124 | 4038 | 4295 | 4435 | 0.3 |
| | After heating | 239.0 | 5.677 | 0.440 | 0.121 | 3997 | 4264 | 4405 | |
| Example 25 | At the beginning | 354.5 | 8.699 | 0.666 | 0.176 | 3962 | 4285 | 4551 | 0.3 |
| | After heating | 320.6 | 8.178 | 0.641 | 0.171 | 3921 | 4246 | 4505 | |
| Example 26 | At the beginning | 4586 | 78.93 | 4.814 | 1.044 | 4341 | 4664 | 5218 | 0.4 |
| | After heating | 1709 | 38.74 | 3.045 | 0.772 | 4046 | 4241 | 4683 | |
| Example 27 | At the beginning | 14.38 | 0.825 | 0.112 | 0.041 | 3055 | 3335 | 3410 | 0.3 |
| | After heating | 12.58 | 0.762 | 0.108 | 0.040 | 2996 | 3263 | 3342 | |
| Example 28 | At the beginning | 4995 | 74.46 | 4.167 | 0.890 | 4495 | 4808 | 5271 | 0.4 |
| | After heating | 2108 | 39.91 | 2.854 | 0.706 | 4239 | 4398 | 4771 | |
| Example 29 | At the beginning | 2573 | 59.20 | 4.692 | 1.196 | 4031 | 4227 | 4665 | 0.4 |
| | After heating | 1004 | 29.92 | 3.001 | 0.893 | 3755 | 3834 | 4139 | |
| Example 30 | At the beginning | 124258 | 1614 | 56.86 | 8.649 | 4642 | 5579 | 6428 | 0.8 |
| | After heating | 31152 | 424.9 | 21.86 | 4.715 | 4590 | 4947 | 5236 | |
| Example 31 | At the beginning | 90.52 | 4.063 | 0.465 | 0.151 | 3317 | 3613 | 3843 | 0.4 |
| | After heating | 55.74 | 2.920 | 0.381 | 0.133 | 3152 | 3393 | 3608 | |
| Example 32 | At the beginning | 75.27 | 2.446 | 0.233 | 0.069 | 3662 | 3918 | 4138 | 0.4 |
| | After heating | 69.09 | 2.257 | 0.226 | 0.069 | 3656 | 3838 | 4055 | |
| Example 33 | At the beginning | 47.52 | 1.781 | 0.193 | 0.061 | 3510 | 3703 | 3933 | 0.4 |
| | After heating | 43.29 | 1.628 | 0.184 | 0.060 | 3506 | 3639 | 3810 | |
| Comparative Example 1 | At the beginning | 122679 | 97.49 | 1.004 | 0.075 | 7628 | 7630 | 8855 | 3.5 |
| | After heating | 95942 | 90.00 | 1.023 | 0.076 | 7450 | 7466 | 8893 | |

Also, in order to examine the endurance of the thermistor elements, each of the foregoing thermistor elements was subjected to heat treatment in the air at 1,000° C. for 150 hours; the resistance values after heating were measured in the same manner as described above; and the B-values were calculated in the same manner as described above on a basis of the resistance values after heating at 100, 300, 600 and 900° C., respectively. The results obtained are shown together in Tables 4 to 6.

Further, the rate of change in resistance after the foregoing heat treatment was determined according to the following expression (3).

$$[\text{Rate of change in resistance}] = \{(R_T' - R_T)/R_T\} \times 100 \quad (3)$$

$R_T$: Resistance value (kΩ) at the absolute temperature T before the heat treatment $R_T'$: Resistance value (kΩ) at the absolute temperature T after the heat treatment Also, the temperature-conversion value (° C.) of the foregoing rate of change in resistance was determined according to the following expression (4).

$$[\text{Temperature-conversion value}] = [(B \times T)/\{\ln(R_T'/R_T) \times T + B\}] - T \quad (4)$$

B: B-Value at the beginning at the absolute temperature T

The results obtained are shown in Table 7.

TABLE 7

| | Rate of change in resistance (%) | | | | Temperature-conversion value (° C.) | | | |
|---|---|---|---|---|---|---|---|---|
| | 100 | 300 | 600 | 900 | 100 | 300 | 600 | 900 |
| Example 1 | 55 | 26 | 4 | 1 | −13 | −16 | −6 | −3 |
| Example 2 | 40 | 19 | 5 | 2 | −10 | −13 | −8 | −4 |
| Example 3 | −20 | −14 | −7 | −4 | 7 | 10 | 9 | 8 |
| Example 4 | 0 | 0 | 2 | 5 | 0 | 0 | −3 | −10 |
| Example 5 | −7 | −6 | −2 | 0 | 2 | 4 | 2 | 0 |
| Example 6 | 2 | 5 | 5 | 5 | −1 | −3 | −7 | −9 |
| Example 7 | −3 | −6 | −3 | −1 | 1 | 4 | 4 | 2 |
| Example 8 | 122 | 70 | 3 | 1 | −25 | −39 | −6 | −5 |
| Example 9 | 69 | 48 | 2 | 0 | −16 | −28 | −3 | −2 |
| Example 10 | 33 | 27 | 4 | 1 | −9 | −18 | −7 | −2 |
| Example 11 | −3 | −3 | −1 | −1 | 1 | 2 | 2 | 3 |
| Example 12 | 2 | 2 | 3 | 3 | −1 | −1 | −5 | −8 |
| Example 13 | −13 | −5 | −2 | 0 | 4 | 4 | 3 | −1 |
| Example 14 | 0 | 1 | 1 | 1 | 0 | −1 | −2 | −3 |
| Example 15 | −2 | −1 | −1 | −2 | 1 | 1 | 1 | 5 |
| Example 16 | −1 | 0 | 1 | 1 | 0 | 0 | −2 | −4 |
| Example 17 | −2 | −2 | −1 | 0 | 1 | 2 | 2 | −1 |
| Example 18 | −4 | −3 | −2 | −1 | 1 | 2 | 3 | 4 |
| Example 19 | −8 | −4 | −2 | −1 | 3 | 3 | 4 | 2 |
| Example 20 | −5 | −2 | 0 | 1 | 2 | 2 | 0 | −4 |
| Example 21 | −8 | −4 | −2 | −1 | 3 | 4 | 3 | 2 |
| Example 22 | −8 | −5 | −2 | −1 | 3 | 4 | 4 | 2 |
| Example 23 | −12 | −7 | −3 | −2 | 5 | 6 | 6 | 5 |
| Example 24 | −9 | −5 | −3 | −2 | 3 | 4 | 6 | 7 |
| Example 25 | −10 | −6 | −4 | −2 | 4 | 5 | 7 | 8 |
| Example 26 | −63 | −51 | −37 | −26 | 35 | 55 | 72 | 85 |
| Example 27 | −13 | −8 | −3 | −2 | 6 | 8 | 8 | 6 |
| Example 28 | −58 | −46 | −32 | −21 | 29 | 46 | 58 | 64 |
| Example 29 | −61 | −49 | −36 | −25 | 36 | 58 | 80 | 93 |
| Example 30 | −75 | −74 | −62 | −45 | 47 | 91 | 130 | 146 |
| Example 31 | −38 | −28 | −18 | −12 | 22 | 32 | 41 | 49 |
| Example 32 | −8 | −8 | −3 | −1 | 3 | 7 | 6 | 3 |
| Example 33 | −9 | −9 | −5 | −2 | 4 | 8 | 10 | 5 |
| Comparative Example 1 | −22 | −8 | 2 | 1 | 5 | 3 | −2 | −2 |

[3] Advantage of the Examples:

It is noted from Tables 1 to 3 that each of Examples 1 to 31 containing Sr, Y, Mn, Al, Fe, Si, and O and Examples 32 and 33 containing Sr, Y, Mn, Al, Fe, and O but substantially free from Si contains not only a perovskite type oxide ($FeYO_3$ or $AlYO_3$) and a garnet type oxide ($Y_3Al_5O_{12}$ or $Al_2Fe_3Y_3O_{12}$) but also at least one of an Sr—Al based oxide and an Sr—Fe based oxide. Also, it is noted that in Examples 1 to 33, Sr—Y—O or Sr—Si—Y—O or the like can exist.

From the powder X-ray diffraction pattern of the thermistor element (sintered body for thermistor element) of Example 4 (see FIG. 6), it can be confirmed that $FeYO_3$ of a perovskite type structure (JCPDS card No. 39-1489), $Al_2Fe_3Y_3O_{12}$ of a garnet type structure (JCPDS card No. 44-0227) and an Sr—Fe based oxide are present. Here, though the formation of an Sr—Al based oxide in the thermistor element of Example 4 cannot be detected by the powder X-ray diffraction because it is a trace amount, its presence can be confirmed by performing the surface analysis by EDS. Incidentally, in this specification, when the sintered body for thermistor element is subjected to surface analysis by EDS, if the detected average concentration of the Sr element and the Al element is higher than the average concentration of the other elements, it is considered that the "crystal phase of an Sr—Al based oxide" is contained. Also, it is noted from the reflected electron image of Example 4 as shown in FIG. 4 that the crystal particles of the thermistor sintered body constituting this thermistor element are block-shaped and large, the average particle size being approximately 7 µm. From the powder X-ray diffraction pattern of the thermistor element (sintered body for thermistor element) of Example 18 (see FIG. 7), it can be confirmed that $AlYO_3$ of a perovskite type structure (JCPDS card No. 33-0041), $Y_3Al_5O_{12}$ of a garnet type structure (JCPDS card No. 09-0310), Sr—Al based oxides ($SrAl_2O_4$: JCPDS card No. 34-0379, $Sr_5Al_2O_8$: JCPDS card No. 10-0065), and an Si oxide ($Sr_2SiO_4$: JCPDS card No. 39-1256) are present. Incidentally, it is noted from the reflected electron image of Example 18 as shown in FIG. 5 that the crystal particles of the thermistor sintered body constituting this thermistor element are small and arranged compactly.

Further, from the powder X-ray diffraction pattern of the thermistor element (sintered body for thermistor element) of Example 33 (see FIG. 8), it can be confirmed that $AlYO_3$ of a perovskite type structure, $Y_3Al_5O_{12}$ of a garnet type structure, an Sr—Al based oxide ($SrAl_2O_4$), and $Al_2Y_4O_9$ (JCPDS card No, 34-0368 or 14-0475) are present.

Also, it is noted from Tables 4 to 6 that since Examples 1 to 33 are thermistor elements not containing elemental Ti, with respect to the initial characteristics, the B-value is extremely small compared with that in Comparative Example 1 and that since Examples 1 to 33 do not contain a readily volatile Cr element, the dispersion of the B-value is not more than 2.0%, small compared with that in Comparative Example 1. Thus, it is noted that the thermistor elements of Examples 1 to 33, each of which does not contain elemental Ti or Cr and contains not only crystal phases of a perovskite type oxide and a garnet type oxide but also a crystal phase of an Sr—Al based oxide or an Sr—Fe based oxide or both, have small dispersion of the B-value and small dispersion of other characteristics compared with those of Comparative Example 1, and therefore have excellent characteristics. Even in the cases where Si is not contained as in Examples 32 and 33, there is excellent performance.

From Table 7, since in Examples 1 and 2, z is less than 0.275; in Examples 8 to 10, 26, 28, 29 and 30, x and y fall outside the foregoing preferred ranges; and in Example 31, (1−y−z) is less than 0.025, both the rate of change in resistance and the temperature-conversion value become slightly larger, thus showing slight instability over the thermal history.

On the other hand, it is noted that in Examples 3 to 7, 11 to 25, 27, 32 and 33 which are obtained by changing the composition ratios within the ranges of 0.090≦x≦0.178, 0.090≦y≦0.178, z≧0.275, and (1−y−z)≧0.025, all of the temperature-conversion values at 100, 300, 600 and 900° C. fall within 10° C., thus showing stability over the thermal history and high endurance. In particular, in Examples 13 to 15 and 17 to 25 having the relationship of 0.126≦x≦0.166, 0.126≦y≦0.166, z≧0.494, and (1−y−z)≧0.080 and having a high Al/(Al+Fe) ratio, it is noted that the resistance value at 100° C. is not more than 500 kΩ at 100° C., and the resistance value at 900° C. is 50 Ω or more, not excessively small; and that all of the temperature-conversion values fall within 8° C. so that not only is there excellent temperature detecting performance over a wide temperature range, but also very good stability of characteristics over the thermal history. Thus, it is found that by setting the proportion of specific constituent elements with a prescribed range, it is possible to provide a thermistor element having excellent temperature detecting performance.

Incidentally, as a example for reference, for the purpose of providing a sintered body for thermistor element having excellent temperature detecting performance in the approximate temperature range from room temperature to approximately 1,000° C., or at the very least from 100 to 1,000° C., and a small difference between resistance values at the beginning and end of the thermal history, this purpose is fulfilled by a sintered body for thermistor element containing Sr, Y, Mn, Al, Fe, and O and not containing Cr, wherein when the mole number of Sr is defined as x, the mole number of Y is defined as (1−x), the mole number of Mn is defined as y, the mole number of Al is defined as z, and the mole number of Fe is defined as (1−y−z), x, y and z are in the ranges $0.090 \leq x \leq 0.178$, $0.090 \leq y \leq 0.178$, $z \geq 0.275$, and $(1-y-z) \geq 0.025$. An example of a compound containing Sr, Y, Mn, Al, Fe, and O which constitutes this sintered body for thermistor element is $Y_{1-x}Sr_xFe_{1-y-z}Mn_yAl_zO_3$. Its crystal structure is preferably a perovskitetype ($ABO_3$); for example, a composition represented by $(Y_{1-x}Sr_x)(Fe_{1-y-z}Mn_yAl_z)O_3$ wherein the A site is $(Y_{1-x}Sr_x)$, and the B site is $(Fe_{1-y-z}Mn_yAl_z)$.

In the foregoing composition, since Y and Sr occupying the A site, and Fe, Mn and Al occupying the B site have an ionic radiuses close to each other, it is possible to easily adjust the resistance value and B-value of the element by freely changing the composition ratio.

Also, since an oxide of Mn occupying the B site has high conductivity, whereas an oxide of Al occupying the B site has high insulation, it is possible to form a thermistor element having the desired bulk conductivity by changing the composition ratio of Mn and Al. Further, since an oxide of Fe has semi-conductive properties, when Fe is contained, it is possible to impart a further change in bulk conductive characteristics.

This sintered body for thermistor element can further contain a component derived from the sintering assistant. As the component derived from the sintering assistant, the above sintering assistants can be applied as they are.

Here, the respective mole numbers of x, y and z as described above are preferably in the ranges $0.095 \leq x \leq 0.175$, $0.095 \leq y \leq 0.175$, $z \geq 0.291$, and $(1-y-z) \geq 0.040$; and $0.126 \leq x \leq 0.166$, $0.126 \leq y \leq 0.166$, $z \geq 0.494$, and $(1-y-z) \geq 0.080$ are especially preferable.

Also, the foregoing object is achieved by a sintered body for thermistor element obtained by mixing respective raw material powders containing respective elements of Sr, Y, Mn, Al, and Fe, molding a thermistor forming powder consisting of a calcined powder having a sintering assistant added thereto, and then calcining the resulting molded compact, wherein when the mole number of Sr is defined as x, the mole number of Y is defined as (1−x), the mole number of Mn is defined as y, the mole number of Al is defined as z, and the mole number of Fe is defined as (1−y−z), x, y and z have the relationship of $0.090 \leq x \leq 0.178$, $0.090 \leq y \leq 0.178$, $z \geq 0.275$, and $(1-y-z) \geq 0.025$.

Here, to manufacture this sintered body, the foregoing first production process can be applied as is. Also, the mole numbers of x, y and z as defined above can have the same the preferred numerical ranges.

As specific examples of the foregoing description, those in the foregoing Examples 1 to 31 and Comparative Example 1 can be applied. That is, sintered bodies for thermistor elements of the compounds having the respective mole numbers of x, y, z, and (1−y−z) in Tables 1 to 3 can be evaluated for their resistance values at the temperatures 100, 300, 600 and 900° C., and the B-values in the respective ranges of from 100 to 300° C., from 300 to 600° C. and from 600 to 900° C. can be obtained from these resistance values. Also, for the rate of change in resistance and the temperature-conversion value, Table 7 can be applied.

According to such sintered bodies for thermistor element, by setting the composition of a compound to contain prescribed constituent elements (Sr, Y, Mn, Al, Fe, and O) within the prescribed range, it is possible to obtain a sintered body having a small change of resistance over the thermal history.

Also, by setting up the foregoing composition within a further limited range, it is possible to obtain a sintered body for thermistor elements which can be used at lower temperatures (lower than 300° C. but the vicinity of 100° C.) than the conventional technologies and which has a small change of resistance over the thermal history of the element. Also, in the sintered body for thermistor element produced in the foregoing manner, since a readily volatile component such as a Cr element is not present at the time of production, it is possible to form a sintered body for element having small dispersion of characteristics.

ADVANTAGE OF THE INVENTION

According to the sintered body for thermistor element of the invention, by containing not only crystal phases of a perovskite type oxide and a garnet type oxide but also a crystal phase of at least one of an Sr—Al based oxide and an Sr—Fe based oxide in a sintered body containing prescribed elements (Sr, Y, Mn, Al, Fe, and O), the sintered body for thermistor element can have a small dispersion of a B-value among individuals and detect a temperature of from the vicinity of 300° C. to approximately 1,000° C. This is also the same in the case where Si is also contained as a component of the sintered body.

Further, by setting the contents of the constituent elements within more limited ranges, it is possible to form a sintered body for thermistor element having a resistance value at 300° C. of not more than 500 kΩ, and preferably a resistance value at 100° C. of not more than 500 kΩ and having a resistance value at 900° C. of 35 Ω or more, and preferably 50 Ω or more. As a result, it is possible to form a sintered body for thermistor elements having maximum detectable temperature of approximately 1,000° C., capable of achieving the temperature detection at a temperature (lower than 300° C., in the vicinity of 100° C.) lower than that of the conventional technologies (300° C. or higher) and having a small change of resistance over the thermal history.

According to the process for producing a sintered body for thermistor element of the invention, it is possible to produce a sintered body for thermistor elements containing not only crystal phases of a perovskite type oxide and a garnet type oxide but also a crystal phase of an Sr—Al based oxide or an Sr—Fe based oxide or both with good efficiency.

The thermistor element and further the temperature sensor which are obtained by using the sintered body for thermistor elements of the invention are useful because they have excellent temperature detecting performance over a wide temperature range.

The invention claimed is:

1. A sintered body for thermistor elements comprising Sr, Y, Mn, Al, Fe, and O, wherein crystal phases of a perovskite type oxide, a garnet type oxide, and at least one of a Sr—Al based oxide and a Sr—Fe based oxide are present, and wherein $FeYO_3$ and/or $AlYO_3$ is selected as said perovskite type oxide, and at least one compound selected from the group consisting of $Y_3Al_5O_{12}$, $Al_2Fe_3Y_3O_{12}$, and $Al_3Fe_3Y_3O_{12}$ is selected as said garnet type oxide, respectively by powder X-ray diffraction analysis.

2. The sintered body for thermistor elements according to claim 1, wherein in said perovskite type oxide and/or said garnet type oxide, there is Sr solid solution in the Y site, Mn and/or Fe solid solution in the Al site, and Al and/or Mn solid solution in the Fe site.

3. The sintered body for thermistor elements according to claim 1, wherein when the mole number of Sr is defined as x, the mole number of Y is defined as (1−x), the mole number of Mn is defined as y, the mole number of Al is defined as z, and the mole number of Fe is defined as (1−y−z), wherein x, y, and z have the relationship of $0.090 \leq x \leq 0.178$, $0.090 \leq y \leq 0.178$, $z \geq 0.275$, and $(1-y-z) \geq 0.025$.

4. The sintered body for thermistor elements according to claim 1, further comprising Si.

5. The sintered body for thermistor elements according to claim 4, wherein $FeYO_3$ and/or $AlYO_3$ is defined as said perovskite type oxide, and at least one compound selected from the group consisting of $Y_3Al_5O_{12}$, $Al_2Fe_3Y_3O_{12}$, and $Al_3Fe_3Y_3O_{12}$ is selected as said garnet type oxide, by power X-ray diffraction analysis.

6. The sintered body for thermistor elements according to claim 4, wherein in said perovskite type oxide and/or said garnet type oxide, there is Sr solid solution in the Y site, Mn and/or Fe solid solution in the Al site, and Al and/or Mn solid solution in the Fe site.

7. The sintered body for thermistor elements according to claim 4, wherein when the mole number of Sr is defined as x, the mole number of Y is defined as (1−x), the mole number of Mn is defined as y, the mole number of Al is defined as z, and the mole number of Fe is defined as (1−y−z), wherein x, y and z have the relationship of $0.090 \leq x \leq 0.178$, $0.090 \leq y \leq 0.178$, $z \geq 0.275$, and $(1-y-z) \geq 0.025$.

8. A process for producing a sintered body for thermistor elements, comprising mixing respective raw material powders containing elemental Sr, Y, Mn, Al, and Fe and calcining the mixture to form a calcined powder; subsequently molding a thermistor forming powder comprising a mixture of the calcined powder with a sintering assistant containing at least elemental Si; and then calcining the resulting molded compact to obtain a sintered body for thermistor element, wherein the sintered body comprises crystal phases of a perovskite type oxide, a garnet type oxide, and at least one of a Sr—Al based oxide and a Sr—Fe based oxide, and wherein $FeYO_3$ and/or $AlYO_3$ is selected as said perovskite type oxide, and at least one compound selected from the group consisting of $Y_3Al_5O_{12}$, and $Al_3Fe_3Y_3O_{l2}$ is selected as said garnet type oxide, respectively by powder X-ray diffraction analysis.

9. A process for producing a sintered body for thermistor elements, comprising mixing respective raw material powders substantially free from elemental Si and containing elemental Sr, Y, Mn, Al, and Fe, and calcining the mixture to form a calcined powder; subsequently molding the thermistor forming powder obtained by pulverizing the calcined powder; and then calcining the resulting molded compact to obtain a sintered body for thermistor elements, wherein the sintered body comprises crystal phases of a perovskite type oxide, a garnet type oxide, and at least one of a Sr—Al based oxide and a Sr—Fe based oxide, and substantially free from Si, and wherein $FeYO_3$ and/or $AlYO_3$ is selected as said perovskite type oxide, and at least one compound selected from the group consisting of $Y_3Al_5O_{12}$, $Al_2Fe_3Y_3O_{12}$, and $Al_3Fe_3Y_3O_{12}$ is selected as said garnet type oxide, respectively by powder X-ray diffraction analysis.

10. A thermistor element, which is characterized by using a sintered body for thermistor elements comprising Sr, Y, Mn, Al, Fe, and O, wherein crystal phases of a perovskite type oxide, a garnet type oxide, and at least one of a Sr—Al based oxide and a Sr—Fe based oxide are present, and wherein $FeYO_3$ and/or $AlYO_3$ is selected as said perovskite type oxide, and at least one compound selected from the group consisting of $Y_3Al_5O_{12}$, $Al_2Fe_3Y_3O_{12}$, and $Al_3Fe_3Y_3O_{12}$ is selected as said garnet type oxide, respectively by powder X-ray diffraction analysis.

11. A temperature sensor, which is characterized by using a sintered body for thermistor elements comprising Sr, Y, Mn, Al, Fe, and O, wherein respective crystal phases of a perovskite type oxide, a garnet type oxide, and at least one of a Sr—Al based oxide and a Sr—Fe based oxide are present, and wherein $FeYO_3$ and/or $AlYO_3$ is selected as said perovskite type oxide, and at least one compound selected from the group consisting of $Y_3Al_5O_{12}$, $Al_2Fe_3Y_3O_{12}$, and $Al_3Fe_3Y_3O_{12}$ is selected as said garnet type oxide, respectively by powder X-ray diffraction analysis.

12. A sintered body for thermistor elements comprising Sr, Y, Mn, Al, Fe and O, wherein crystal phases of a perovskite type oxide, a garnet type oxide, and at least one of a Sr—Al based oxide and a Se—Fe based oide are present, and wherein when the mole number of Sr is defined as x, the mole number of Y is defined as (1−x), the mole number of Mn is defined as y, the mole number of Al is defined as z, and the mole number of Fe is defined as (1−y−z), wherein x, y and z have the relationship of $0.120 \leq x \leq 0.166$, $0.120 \leq y \leq 0.166$, $0.494 \leq z \leq 0.793$, and $(1-y-z) \geq 0.080$.

13. The sintered body for thermistor elements according to claim 12, wherein in said perovskite type oxide and/or said garnet type oxide, there is a Sr solid solution in the Y site, a Mn and/or Fe solid solution in the Al site, and Al and/or Mn solid solution in the Fe site.

14. The sintered body for thermistor elements according to claim 12, which further comprises Si.

* * * * *